UNITED STATES PATENT OFFICE.

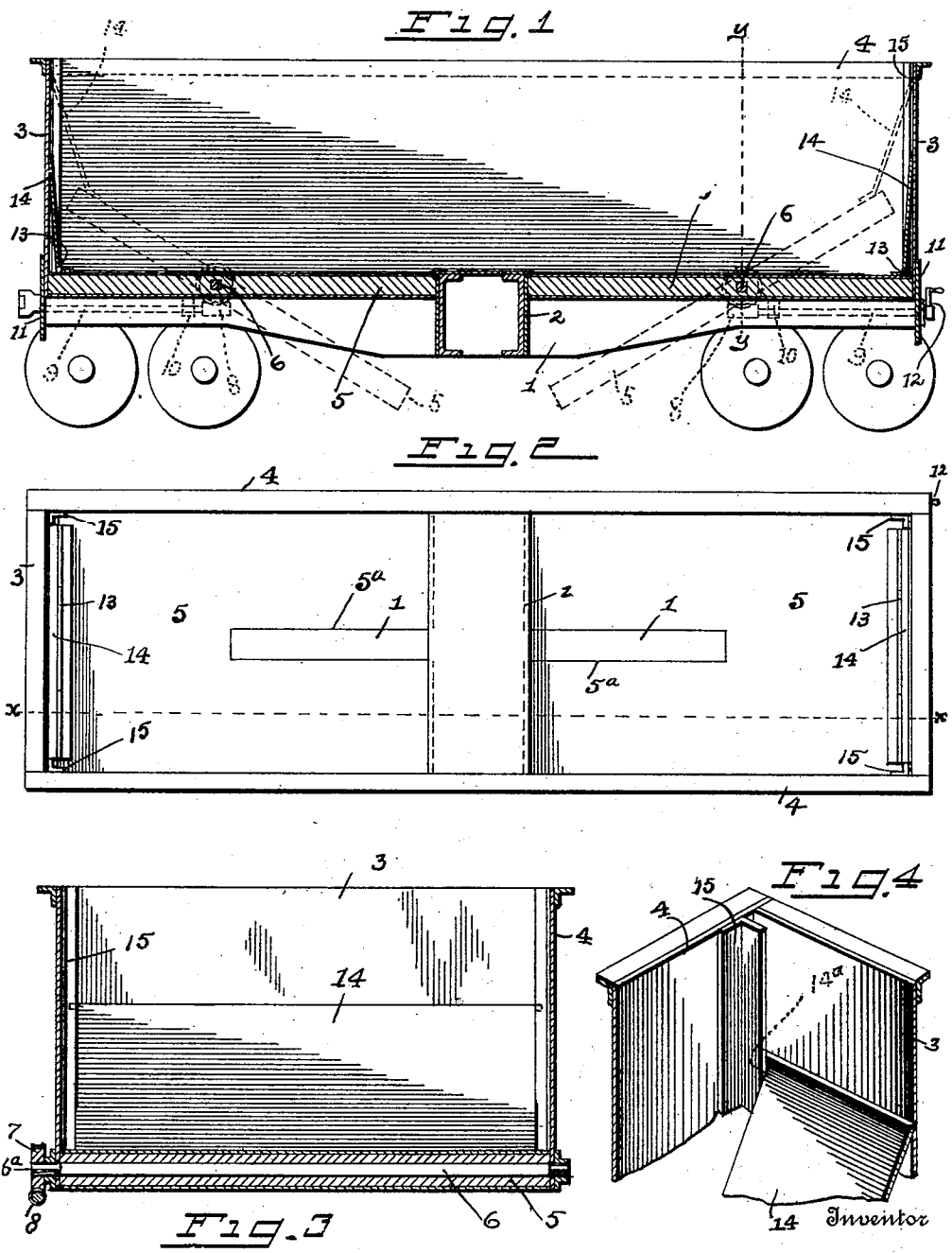

RODERICK W. DAVIES, OF COLUMBUS, OHIO, ASSIGNOR OF ONE-HALF TO WILSON K. DOTY, OF COLUMBUS, OHIO.

DUMP-CAR.

969,462.

Specification of Letters Patent.

Patented Sept. 6, 1910.

Application filed October 11, 1909. Serial No. 522,166.

*To all whom it may concern:*

Be it known that I, RODERICK W. DAVIES, a citizen of the United States, residing at Columbus, in the county of Franklin and State of Ohio, have invented certain new and useful Improvements in Dump-Cars, of which the following is a specification.

My invention relates to the improvement of dump cars of that class which are provided with movable floor sections adapted when in open positions to dump the contents of the car by gravity.

The objects of my invention are to provide a dump car of improved construction and arrangement of parts, in which simple and effective means are provided for positively operating the floor sections; to so construct my improved car as to admit of its use as an ordinary flat-bottomed gondola car or as a dump car for carrying and discharging coal, ore or other material; to provide improved means for directing the entire load of the car through the floor outlet and to produce other improvements the details of which will be more fully pointed out hereinafter.

These objects I accomplish in the manner illustrated in the accompanying drawing, in which—

Figure 1 is a longitudinal section of my improved car taken on line $x$—$x$ of Fig. 2, showing in dotted lines the positions of the floor sections when the latter are turned downward to the dumping positions, Fig. 2 is a plan view, Fig. 3 is a transverse section on line $y$—$y$ of Fig. 1 and, Fig. 4 is a detail view in perspective of the inner portion of one of the car corners.

Similar numerals refer to similar parts throughout the several views.

1 represents the longitudinal under-frame beam of a car and 2 the central cross beam thereof, which frame constructions may be of any desired or usual construction.

3 designates the vertical end walls of the car and 4 the side walls thereof.

In constructing my car for center dumping, I form the floor thereof in two sections, each of which is indicated at 5. These sections are of such dimensions as to extend between the base portions of the side walls of the car and to fill the spaces between the center beam 2 and the ends of the cars when said sections are in the horizontal positions shown in full lines in the drawing. Each of the floor sections has formed therein a longitudinal recess $5^a$ which extends from the center of the width of the inner end of the section a desirable distance in the direction of the length of the section.

Extending transversely through each of the floor sections at a suitable point, is the squared portion of a rod 6, said rod having rounded terminal portions $6^a$ which extend through and beyond the sides of the car. On one of these rounded extensions $6^a$ of each of the rods 6, is carried on the outer side of the car a worm wheel 7 and each of these worm wheels engages a worm 8 which is formed with or secured to one end of a rod 9, which rod is journaled in suitable bearings or hangers 10 which depend from the underside of the outer portion of the car frame. The rods 9 are further journaled in suitable hangers or brackets 11 which depend from the outer ends of the cars and on the outer end of each of the rods 9 is carried a suitable hand rotating device, which may be in the nature of a crank 12, as shown, or which may be a hand wheel or other suitable means for rotating said rod. To the upper face of each of the floor sections 5 adjacent to the outer end thereof, is hinged as indicated at 13, the lower edge portion of an upwardly extending plate 14, the latter inclining, as shown, toward the end of the car and having its upper end portion in contact with the car end. In order to insure this contact of the plate 14 and car end, I preferably provide the upper edge portion of the plate with laterally extending members $14^a$ which as indicated more clearly in Fig. 4 of the drawing, are designed to bear loosely between the end of the car and guide plates 15 which are secured vertically to the inner surfaces of the car sides adjacent to the ends.

Assuming that the car floor sections are in the horizontal positions shown in full lines and that it is desired to dump the contents of the car, it will be understood that such dumping operation will be accomplished by rotating the rods 9, thereby causing through the gear connection of the worm 8 and worm wheel 7, a downward swinging movement of the inner end portion of each of the floor sections, said floor sections thus being made to assume the positions indicated in dotted lines in Fig. 2 of the drawing, in which positions it is obvious that the contents of the car may be discharged by gravity beneath the latter. It will be understood that in the downward swinging movements of the floor sections, those portions of each of said sections which are on opposite sides of the inner end recess 5ª will move downward on opposite sides of the underframe beam 1, thus obviating any tendency of said frame beam toward obstructing the movements of the floor sections.

In order to overcome any tendency of the coal or other material contained in the car toward dropping behind the outer ends of the floor sections when the latter are swung to their inclined positions, I have provided the plates 14 which in the upward movement of the outer end portions of the floor sections will move upward in contact with the car ends, thereby not only forming a suitable closure of the space between the end of the floor section and the end of the car, but forming an inclined plane which will be effective in inducing the contents of the car to move downward toward the dumping point.

Although I have shown and described my improved dumping mechanism, as adapted for dumping the load centrally of the car, it is obvious that the principle of swinging car floor sections from horizontal to inclined positions and vice-versa, might be applied to sections which are arranged transversely of the car instead of longitudinally, as shown, thereby providing a means for dumping the contents of the car at the sides thereof.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a dump car, the combination with a car body comprising an under framework having a central, transversely disposed sill, of a floor section located upon each side of said sill and extending from said sill to the end of the car, each of said floor sections being pivoted to tilt intermediate its ends, means for tilting said sections, filling plates hingedly connected at the outer end of each of the floor sections and adapted to frictionally engage the adjacent car wall, vertical guide strips secured to the side walls of the car, and spaced from the end walls thereof, said strips extending but a short distance beyond the side walls of the car, and extensions carried by said filling plates which enter the spaces between said guide strips and the end walls of the car.

2. In a dump car, the combination with a car body comprising an under-framework and side and end walls, of floor sections each having a pivotal support in the car framework at a point intermediate its ends, a worm wheel carried by the pivot member of each of said floor sections, an operating rod for each of said sections, and a worm carried by said rod which engages said worm wheel.

In testimony whereof I affix my signature in presence of two witnesses.

RODERICK W. DAVIES.

Witnesses:
C. C. SHEPHERD,
A. L. PHELPS.